(12) United States Patent
Major et al.

(10) Patent No.: US 9,661,380 B2
(45) Date of Patent: May 23, 2017

(54) TELEVISION CONTENT MANAGEMENT WITH INTEGRATED THIRD PARTY INTERFACE

(71) Applicant: ECHOSTAR TECHNOLOGIES L.L.C., Englewood, CO (US)

(72) Inventors: Robert Drew Major, Orem, UT (US); Darren Major, Pleasant Grove, UT (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/216,235

(22) Filed: Mar. 17, 2014

(65) Prior Publication Data

US 2014/0282667 A1    Sep. 18, 2014

Related U.S. Application Data

(60) Provisional application No. 61/800,847, filed on Mar. 15, 2013.

(51) Int. Cl.
| | |
|---|---|
| H04N 5/445 | (2011.01) |
| H04N 7/18 | (2006.01) |
| H04N 21/439 | (2011.01) |
| H04N 21/81 | (2011.01) |
| H04N 21/24 | (2011.01) |
| H04N 21/442 | (2011.01) |
| H04N 21/462 | (2011.01) |
| H04N 21/41 | (2011.01) |
| H04N 21/422 | (2011.01) |

(Continued)

(52) U.S. Cl.
CPC ..... *H04N 21/4394* (2013.01); *H04N 21/2407* (2013.01); *H04N 21/4126* (2013.01); *H04N 21/42207* (2013.01); *H04N 21/42209* (2013.01); *H04N 21/42224* (2013.01); *H04N 21/44222* (2013.01); *H04N 21/4622* (2013.01); *H04N 21/4722* (2013.01); *H04N 21/47815* (2013.01); *H04N 21/812* (2013.01); *H04N 21/8173* (2013.01)

(58) Field of Classification Search
CPC .......... H04N 21/2407; H04N 21/4126; H04N 21/42208; H04N 21/42209; H04N 21/44222; H04N 21/4622
USPC ............................. 725/9, 14, 18, 19, 40, 80
See application file for complete search history.

(56) References Cited

U.S. PATENT DOCUMENTS

| | | |
|---|---|---|
| 5,978,791 A | 11/1999 | Farber et al. |
| 6,263,503 B1 | 7/2001 | Margulis |
| 6,928,442 B2 | 8/2005 | Farber et al. |

(Continued)

OTHER PUBLICATIONS

Audible Magic Corporation, White Paper, Digital Fingerprinting & Video Content Recognition Enabling New Forms of Interactive Advertising, Jun. 7, 2011.

(Continued)

*Primary Examiner* — James R Sheleheda
(74) *Attorney, Agent, or Firm* — LK Global

(57) ABSTRACT

Systems, methods and devices manage second screen media content that is associated with live or previously-recorded television programming while the programming is being viewed by a user. A control application provides an HTML5 or other application program interface (API) that allows advertisers, retailers or other third parties to access the remote control application for providing useful features.

20 Claims, 2 Drawing Sheets

Figure 1:
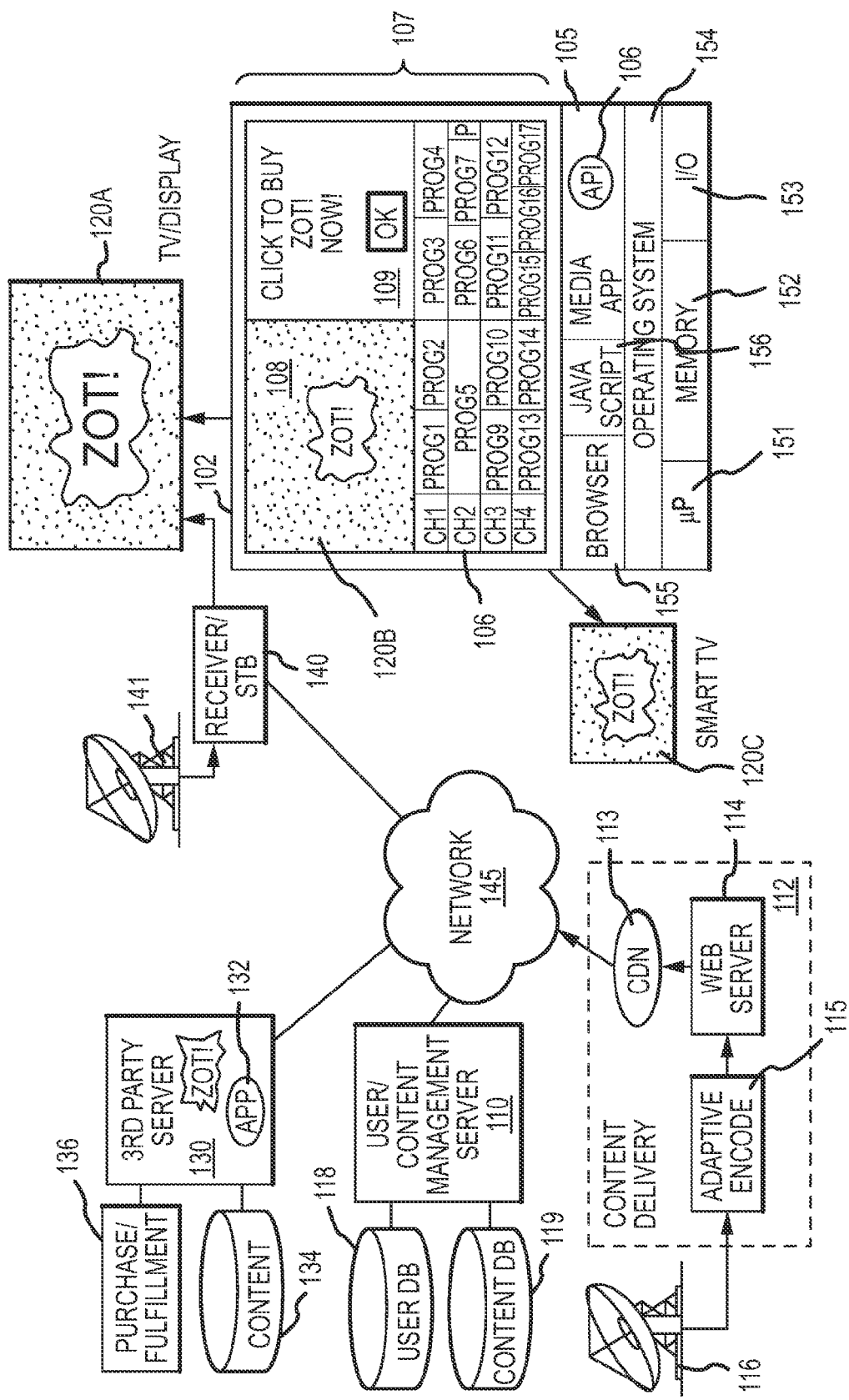

(51) Int. Cl.
    *H04N 21/4722* (2011.01)
    *H04N 21/478* (2011.01)

(56) References Cited

U.S. PATENT DOCUMENTS

| | | |
|---|---|---|
| 6,968,337 B2 | 11/2005 | Wold |
| 7,500,007 B2 | 3/2009 | Ikezoye et al. |
| 7,529,659 B2 | 5/2009 | Wold |
| 7,562,012 B1 | 7/2009 | Wold et al. |
| 7,707,614 B2 | 4/2010 | Krikorian et al. |
| 7,797,249 B2 | 9/2010 | Schmelzer et al. |
| 7,818,444 B2 | 10/2010 | Brueck et al. |
| 7,877,438 B2 | 1/2011 | Schrempp et al. |
| 7,877,776 B2 | 1/2011 | Krikorian et al. |
| 7,917,645 B2 | 3/2011 | Ikezoye et al. |
| 8,006,314 B2 | 8/2011 | Wold |
| 8,082,150 B2 | 12/2011 | Wold |
| 8,086,445 B2 | 12/2011 | Wold et al. |
| 8,401,904 B1* | 3/2013 | Simakov et al. ............... 705/16 |
| 8,527,774 B2* | 9/2013 | Fallows et al. ............... 713/178 |
| 8,583,643 B2* | 11/2013 | Kanefsky ...................... 707/736 |
| 8,978,075 B1* | 3/2015 | Kaiser ...................... H04N 5/44 725/105 |
| 2004/0148424 A1 | 7/2004 | Berkson et al. |
| 2006/0174287 A1 | 8/2006 | Maeda |
| 2006/0222321 A1 | 10/2006 | Russ |
| 2006/0245625 A1* | 11/2006 | Tichelaar .......... G06F 17/30781 382/124 |
| 2007/0157266 A1* | 7/2007 | Ellis ................... H04L 12/2816 725/89 |
| 2009/0235313 A1 | 9/2009 | Maruyama et al. |
| 2010/0169934 A1 | 7/2010 | Kennedy |
| 2011/0289098 A1 | 11/2011 | Oztaskent et al. |
| 2011/0306368 A1* | 12/2011 | McCarthy .......... G06Q 30/0241 455/466 |
| 2012/0136701 A1* | 5/2012 | Relan .................... G06Q 30/02 705/14.4 |
| 2012/0144416 A1* | 6/2012 | Wetzer ............ H04N 21/25816 725/14 |
| 2012/0210216 A1 | 8/2012 | Hurst |
| 2012/0240162 A1* | 9/2012 | Rose .................. H04N 21/2187 725/38 |
| 2012/0240177 A1* | 9/2012 | Rose ............................ 725/116 |
| 2012/0311074 A1* | 12/2012 | Arini et al. ................... 709/217 |
| 2013/0018936 A1* | 1/2013 | D'Amico ......... H04N 21/44008 709/201 |
| 2013/0347018 A1* | 12/2013 | Limp ................. H04N 21/4826 725/19 |
| 2014/0007155 A1 | 1/2014 | Vemparala et al. |
| 2014/0082651 A1* | 3/2014 | Sharifi ............ H04N 21/23418 725/20 |
| 2014/0254806 A1* | 9/2014 | Fonseca, Jr. ......... H04R 29/008 381/56 |
| 2014/0282667 A1* | 9/2014 | Major .................. H04N 21/812 725/18 |
| 2014/0282693 A1* | 9/2014 | Soundararajan ..... H04N 21/435 725/32 |
| 2014/0365299 A1* | 12/2014 | Barenzung ......... G06Q 30/0251 705/14.49 |

OTHER PUBLICATIONS

U.S. Patent and Trademark Office, Non-Final Office Action, dated May 23, 2014 for U.S. Appl. No. 13/836,688.

Major, Robert Drew, Pre-Distribution Identification of Broadcast Television Content Using Audio Fingerprints, U.S. Appl. No. 13/836,688, filed Mar. 15, 2013.

U.S. Patent and Trademark Office, Final Office Action, dated Jan. 29, 2015 for U.S. Appl. No. 13/836,688.

USPTO, Office Action for U.S. Appl. No. 13/836,688 mailed Aug. 17, 2015.

USPTO Final Office Action, U.S. Appl. No. 13/836,688, Issued Mar. 10, 2016.

\* cited by examiner

TELEVISION CONTENT MANAGEMENT WITH INTEGRATED THIRD PARTY INTERFACE

RELATED APPLICATION

This application claims priority to U.S. Provisional Application Ser. No. 61/800,847, which was filed on Mar. 15, 2013.

TECHNICAL FIELD

The present disclosure generally relates to manageably expanding a television viewer's media experience, including second screen interactions with advertisers, retailers, or other third parties.

BACKGROUND

With the advent of digital streaming technologies, as well as the development of ever-advanced network communications and data processing devices, television viewers are no longer content to simply watch TV in a non-interactive manner. To the contrary, many viewers continually demand new and exciting viewing experiences that provide additional features and opportunities. At the same time, advertisers, retailers and other third parties are seeking increasing opportunities to interact with end customers.

It is therefore desirable to create systems, devices and methods that manageably expand the television viewing experience through improved interaction with advertisers, retailers and/or other third parties. These and other desirable features and characteristics will become apparent from the subsequent detailed description and the appended claims, taken in conjunction with the accompanying drawings and this background section.

BRIEF SUMMARY

Various embodiments provide a television remote control application on a tablet, smartphone or similar device. The application includes an HTML5 or other application program interface (API) that allows advertisers, retailers or other third parties to access the remote control application for providing useful features. The third party content could be coordinated with television content currently being watched by the viewer.

According to various exemplary embodiments, a media player, personal computer, tablet computer, mobile phone, video game player or other computing device suitably comprises a processor, a memory and an interface to a network such as the Internet. The processor configured to execute a remote control application that controls television content presented on a display viewed by a viewer, wherein the remote control application comprises an application program interface that allows an application controlled by a third party to provide content to the remote control application relates to the content currently being viewed by the user.

Other embodiments provide methods executable by personal computers, mobile phones, laptop or tablet computers, video game players and/or other computing devices to provide user control of a television. The method suitably comprising executing a remote control application on the computing device that generates a display on a user interface that presents content from a third party, wherein the third party provides the content to the remote control application via an application program interface, and wherein the remote control application requests the content from the third party based upon content currently presented on the viewer's television.

Still other embodiments provide methods executable by a computing device to provide user control of a television. The method suitably comprises executing a remote control application that generates a display on a user interface that presents content from a third party, wherein the third party provides the content to the remote control application via an application program interface, and wherein the remote control application requests the content from the third party based upon content currently presented on the viewer's television.

Additional and alternate embodiments, aspects and other features are described in more detail herein.

BRIEF DESCRIPTION OF THE DRAWING FIGURES

Figure 2:
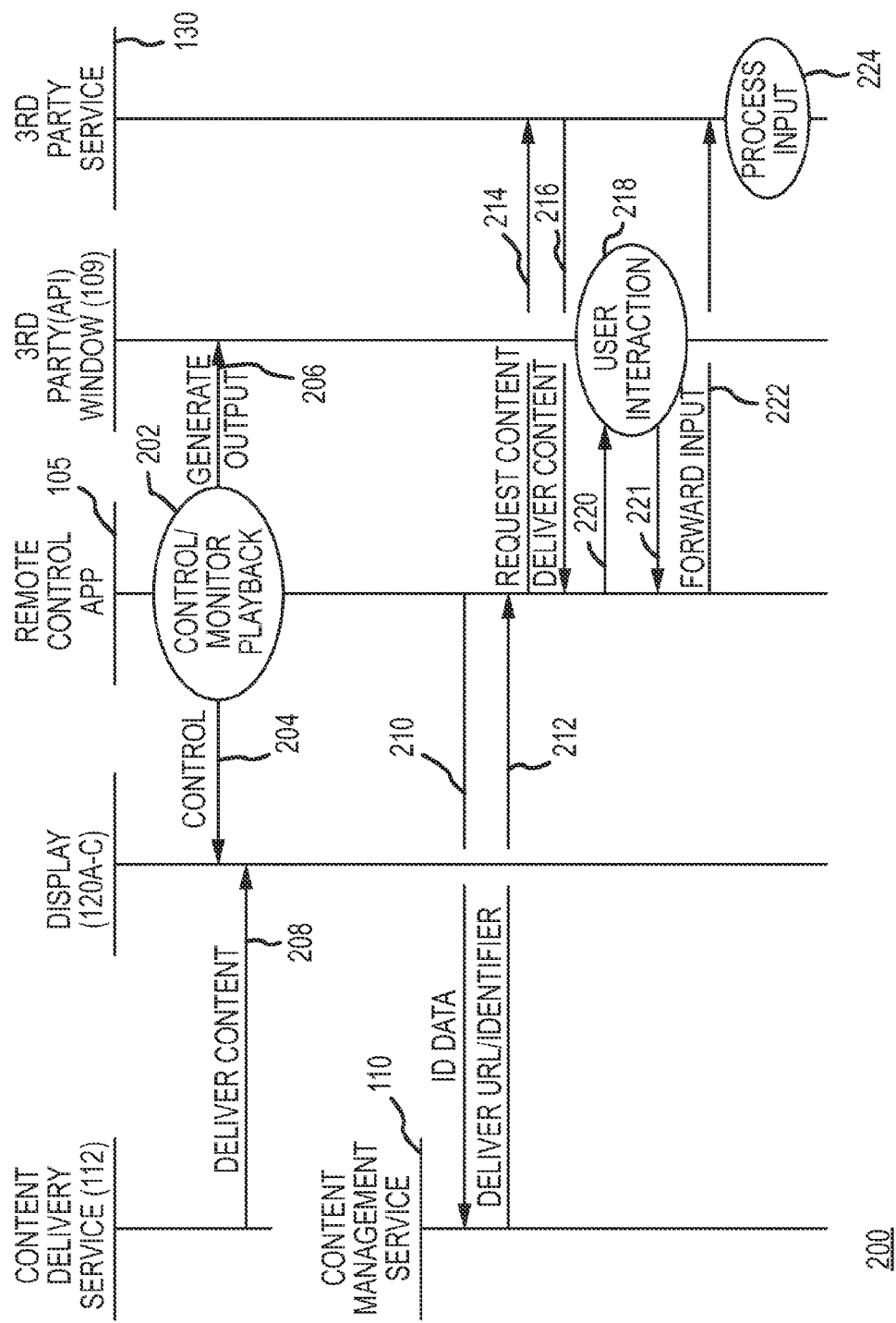

Exemplary embodiments will hereinafter be described in conjunction with the following drawing figures, wherein like numerals denote like elements, and FIG. 1 is a block diagram of an example system 100 to allow third party access to a remote control application; and FIG. 2 is a data flow diagram showing an example process for interacting with third parties via a remote control application.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments provide a remote control application 105 executable on a tablet PC, computer system, mobile telephone, video game player, personal digital assistant, remote control and/or other device 102 that not only controls television content presented on the viewer's television displays 120A-C, but that also allows advertisers, retailers and/or other third parties to access the viewer's interface via an application program interface (API). In various embodiments, an application 105 includes an HTML5 or similar API that allows third party services 130 to provide additional content such as images, links, video, games or anything else for the customer's enjoyment. The third party content may be presented in a window 107 of the device's display, as desired. Content from the third party may be presented in a browser window within the application interface, for example, using Javascript or similar constructs.

FIG. 1 illustrates on example of a system 100 to provide third party integration into the user's television viewing experience via a computing device 102. Typically, computing device 102 represents a personal computer, mobile phone, laptop or tablet computer, remote control, video game player, media player and/or other "second screen" device that allows viewing of web content or the like at the same time that the viewer is watching a television program. In the example of FIG. 1, a subscriber may be watching a conventional television 120A, a smart television 120B, and/or a television window 120C in the interface of device 102 itself. When an identified program segment (e.g., an advertisement) appears on one or more of the television viewing screens 120A-C, the control application 105 executing on device 102 recognizes the program content based upon information obtained from a content management server 110, from information contained in an electronic program guide, from information contained in the video stream itself, and/or from any other source.

When the content is recognized, application 105 suitably contacts a third party service 130 associated with the then-showing television content to obtain additional content, or to take other actions as appropriate. This contact may be initiated by following a URL or other identifier provided by the content management server 110 or any other source. In the example of FIG. 1, a window 107 of the control application interface displays a web page that includes an instant purchase feature (e.g., a "one-click" link to a retail site) for a product that is being currently advertised on the viewer's television. In this example, the viewer could simply click on the active link to be connected to the third party's web service 130 to purchase the item, or to take other actions. Other actions could include signing up for a mailing list, coupon or free sample. Still other embodiments could use the API 106 to deliver a coupon, voucher or the like directly to device 102 for later redemption; if the product is a digital product (e.g., video, audio, video game, electronic book, or similar content), then the product may be purchased directly using API 105. In this example the newly-purchased product may be downloaded directly to device 102 or to another device associated with the viewer, as desired. Other embodiments could provide video, graphics, text, audio and/or other multimedia content to the interface 107 using HTML5 or similar constructs.

As shown in FIG. 1, computing device 102 is a computer, tablet, mobile phone, media player or other device based upon conventional hardware, such as a processor 151, memory 152 and input/output interfaces 153. Most computing devices 102 operate under control of an operating system 154 that executes applications, such a web browser 155 and media control application 105. In various embodiments, browser 155 and media control application 105 may be combined or otherwise integrated so that web and other media can be simultaneously presented on a display. In the embodiment shown in FIG. 1, a scripting environment 156 (such as JavaScript or the like) is provided to execute client-side scripts embedded in web content obtained from 3$^{rd}$ party service 130 or the like.

Media control application 105 typically provides control functionality to programming viewed on one or more of displays 120A, 120B and/or 120C. That is, the user typically uses media control application 105 to change channels, control PVR/DVR recordings, view electronic program guide data and/or other features as desired. In various embodiments, media control application 105 communicates with services on network 145 to identify currently-viewed television content and/or to present additional third party content that is associated with the currently-viewed television programming. Program content may be identified from data in an electronic program guide provided from content delivery system 112 or content management system 110, for example. Alternatively, program content may be identified based upon audio fingerprinting or other factor by communicating with content management system 110, as described below. After content is identified, additional third party content that is associated with the identified content can be identified by content management system 110 or the like, and a uniform resource locator (URL) or other address of the associated content can be delivered from content management system no to computing device 102 as desired. Media player 105 and/or browser 155 can then use the URL/identifier to contact a third party service 130 and obtain additional content related to the currently-viewed program for presentation while the viewer is still watching the identified television programming on display 120A, 120B or 120C.

Third party content is integrated with the media player application 105 using an appropriate application program interface 106, such as an HTML5 interface or the like. API 106 could facilitate any number of third party applications. In addition to supplemental advertising, another service could provide custom video streams (e.g., customized highlight reels based upon the user's preferences; a video highlight clip featuring the viewer's own fantasy sports picks; etc.), customized web pages (e.g., fantasy sports statistics while the viewer is watching games; stock prices while the viewer is watching financial news; local news/weather; etc.), gaming, audio content, messaging, social media and/or the like. A wide array of applications or features could make use of the newly-obtained access to the viewer's second screen while identified programming is being viewed, thereby greatly improving the user experience in many different ways.

FIG. 1 shows an example interface 107 that presents an electronic program guide grid 106, media controls, a program content window 108, and a third party content window 109. The particular implementations of interface 107 may vary widely from embodiment to embodiment to incorporate different and/or additional features. In this example, window 108 provides a display 120B of live or pre-recorded television content; other embodiments could eliminate this display 120B and instead use application 105 to control external displays 120A and/or 120B.

In the example of FIG. 1, remote control application 105 is aware of the content currently being viewed on the television since the viewer uses the application to change channels, to select programs on a DVR/RSDVR, to obtain streaming video and/or the like. In further embodiments, the application 105 is aware of particular ads or other content currently presented on any of the viewer's displays 120A-C. Application 105 may obtain this information from, for example, content management system 110 and/or video delivery system 112. Various systems and techniques for determining and sharing the particular contents of a live stream is described in U.S. patent application Ser. No. 13/836,688, "PRE-DISTRIBUTION IDENTIFICATION OF BROADCAST TELEVISION CONTENT USING AUDIO FINGERPRINTS", which was filed on the same day as this application and which is incorporated herein by reference. Audio fingerprinting, for example, could be used to identify currently-broadcast advertisements and other content so that applications such as those described herein can know which third parties to contact when the contact is shown on one of the user's television displays 120A-C. In this example, the third-party information may be provided to remote control application 105 even if the content viewing is place or time shifted, since the information is associated with the content itself in management system no rather than the broadcast schedule. In various embodiments, information is associated with the particular content of advertisements or other programming rather than with the broadcast itself. This allows, for example, third party content to be triggered based upon the content of the ad itself, rather than the program, channel or network that is running the ad. That is, active content could be provided to the API whenever the ad was viewed on any display 120A-C, regardless of the channel that the ad is running on or the time of broadcast. If an advertiser wants to supplement all of its broadcast ads on any network, channel or time with a supplemental web presence, for example, various embodiments of system 100 would be able to provide such features. Further, the content can be identified even if it has been place and/or time shifted, thereby allowing active content to be made available whenever it is of greatest interest to the user. Rather than relying upon guide data or other static data sources to identify advertisement times and contents, then, the use of a live content management system can greatly improve the flexibility and usefulness of the system 100. Moreover, the advertiser receives a benefit in that all of its ads can be enhanced with supplemental content, regardless of the time or network that is broadcasting the ad.

In various embodiments, then, content management system no provides information to the application 105 that allows the application 105 to know which advertisements are being played and which third party service 130, if any, to contact for additional content. In various embodiments, the application 105 provides a user interaction window 109 of its interface 107 that can be made available to third parties via the API 106. In a typical implementation, third party content presented in window 109 is requested from the third party service 130 in HTML5 or similar format. Application 105 suitably formats and presents the received content in interface window 107 using Javascript or similar constructs. Javascript or the like could also be used to handle any viewer interactions, inputs or the like that need to be passed from application 105 via API 106 to a server application 132 executing at the third party service 130.

Television programming may be delivered to displays 120A, 120B and/or 120C in any manner. In the example of FIG. 1, television 120A receives a conventional cable, IPTV, broadcast or direct broadcast satellite (DBS) feed 141 from a receiver 140, such as a conventional set top box (STB). Receiver 140 may be in communication with control device 102 to receive instructions for changing channels, setting DVR timers and/or performing other functions as desired.

Displays 120A, 120B and/or 120C may additionally or alternately receive television programming via network 145 from a video-on-demand, RSDVR or other network delivery system 112. In various embodiments, system 112 receives broadcast content 116 that is similar to content 141 received by receiver 140, but that is instead encoded (e.g., adaptively encoded) by encoder 115 and stored with a web server 114 or the like for delivery over network 145. Adaptively encoded media content may be distributed using an appropriate content delivery network (CDN) as desired to provide rapid delivery of program segments requested by media player clients throughout network 145. Program guide data may be provided to computing device 102 from content delivery system 112, content management system 110, another service on network 145, and/or via a television receiver (e.g., receiver 140).

Media content management system no suitably includes appropriate computing hardware, software and databases to deliver program information as described herein. In various embodiments, media content management system 110 accesses a user database 118 to authenticate/identify users (e.g., current account holders with a DBS, cable, IPTV or other television delivery service) and to identify content viewed by the various viewers. As noted above, content may be identified based upon program guide data, based upon audio fingerprinting of the actual program being viewed, or in any other manner. To that end, audio fingerprints or other identifying data about various programs, advertisements or other program contents could be stored in database 119. As applications 105 submit audio segments or other data for identification, content management system 110 suitably identifies associated programming and provides the submitting application 105 with URLs or other identifiers of associated third party content.

Third party server 130 suitably includes appropriate computing hardware, software and databases to provide a desired service to applications 105 as described herein. In various embodiments, server 130 suitably executes a server-side application 132 that delivers HTML5 or other web content in response to HTTP or similar requests received from computing devices 102. Applications may vary from service to service, but could include order fulfillment (as processed by system 136), delivery of static or dynamic web content, multimedia content, games and/or other content as desired from database 134.

In practice, then, control application 105 executes on computing device 102. User inputs make changes to programming viewed on displays 120A, 120B and/or 120C as appropriate. Application 105 further communicates with content management service 110 to identify the actual programming that the viewer is watching at any particular time. This programming may represent a program, a scene of a program, a commercial, or the like. After identifying the programming being currently displayed, the application is able to obtain (using network URLs or the like obtained from content management server 110) associated third-party content that can be presented in a window 109 at the same time that the viewer is watching the identified programming. In various embodiments, the associated third-party content could solicit inputs from the viewer that are returned to an application 132 executed by the third party service 130. Communications between the computing device 120 and the third party service 130 are handled by an API 106, as appropriate.

FIG. 2 provides additional detail about various functions that could occur during operation of system 100. As shown in FIG. 2, the viewer uses remote control application 105 to control his or her television viewing experience, so the application 105 "knows" what the viewer is watching, as described above. Using this information, application 105 obtains third party content at appropriate times so that the third party content corresponds to the imagery being presented on the television. The third party content may be any sort of HTML5 content, including audio, video, weblinks and/or the like. Using Javascript or similar constructs, the received content is presented to the viewer in an interface window 107, and customer interactions are processed as needed. Various embodiments could allow the third party content to adjust or otherwise control the playback of content on device 102 and/or on the television, as desired. Further embodiments could provide HTTP live streaming (HLS) or other video content to device 102 and/or televisions 120A-C, as desired. Again, any number of different functions and features could be provided in any number of alternate but equivalent embodiments.

With continued reference to FIG. 2, remote control application 105 executing on computing device 102 suitably controls the television viewing of one or more television displays 102A-C, as described above (function 202). In various embodiments, control application 105 provides control instructions to displays 120A-C (and/or receiver 140, as appropriate) to generate desired imagery on the display 120. Programs may include live broadcasts received from a cable, DBS, terrestrial, IPTV or other broadcast source; other programs could include programs obtained from a personal video recorder that is associated with a receiver 140, a remote storage digital video recorder (RSDVR) accessible via network 145, an on-demand or other video streaming service (e.g., content delivery service 112), or the like. Control instructions 204 sent from application 105 may be sent directly to a television (e.g., smart television 120C), a television receiver 140, to a content delivery service 112, or elsewhere to obtain appropriate television content 208 at the desired video display 120A-C. Again, content may be live broadcast or previously-recorded, as desired.

Remote control application 105 also handles interactions with third party window 109 (function 206) using API 106. In various embodiments, the remote control application 105 uses API 106 to provide third party content that is associated with the currently-viewed television content as the viewer is watching the content. To that end, the remote control application 105 suitably identifies the currently-viewed content (function 210), obtains an identifier for third party content associated with the identified content (function 212), obtains the identified third party content from a third party service 130 (functions 214, 216), and manages interactions between the user and the third party content (function 218) as appropriate.

As noted above, application 105 identifies the currently-viewed content in any manner (function 210). In the example of FIG. 2, application 105 identifies the content by providing an audio fingerprint or other portion of the actual program content itself to management service 110. In other embodiments, identification data may be provided with electronic program guide data or other information available to application 105 so that application 105 is able to identify the currently-viewed programming itself, without additional query to content management service 110. In such embodiments application 105 may identify the program to the content management service no to obtain supplemental content associated with the identified program.

In various embodiments, content management service 110 maintains a database 119 of information that allows identification of programs (e.g., from audio fingerprints or other "biometric" data supplied by application ion). Service 110 additionally maintains a database of URLs or other addresses/identifiers that allow application 105 to locate supplemental content associated with the identified program via network 145. These URLs/identifiers are appropriately delivered to application 105 (function 212) in response to received queries 210.

Having thus received an identifier for content associated with currently-viewed programming, application 105 is able to obtain the identified content from third party server 130 (function 214). Content may be requested using conventional HTTP constructs, for example, or other interaction with application 132 as desired. Third party server 130 suitably obtains the requested content and delivers it to the control application 105 via network 145, as appropriate (function 216).

Third party content is rendered to the viewer in window 109 (or elsewhere, as appropriate). As noted above, application 105 suitably includes API 106 that provides an HTML5 or other interface between the third party service 130 and the application 105. To that end, application 105 suitably renders imagery or other media to the API window 109 (function 220) and processes an inputs received from the API window 109 (function 221) as desired. User interaction (function 218) with the API window 109 may include clicking on a purchase button, requesting additional information, responding to requests for information, controlling a media stream supplied by third party service 130, and/or any other interactions as desired. Inputs received from the user interaction 218 are appropriately forwarded to the third party service 130 (function 222) to thereby allow the remote service 130 to process the input (function 224) as desired.

To continue the example above, an advertisement for a product (e.g., "Zot!") can be recognized as the television ad is presented on a display 120A-C controlled by application 105. This recognition may take place even if the currently-viewed content has been time or place shifted, as desired. The application 105 recognizing the currently-viewed program then obtains a URL or other identifier from content management service 110, and then uses the identifier to request third party content to be presented in a separate window 109 as the identified programming is still being presented on the viewer's display 120A-C. Content is processed using a suitable API 106 that allows third party content to be safely and securely received. Any user inputs (e.g., an input authorizing purchase of an advertised product) are also handled via the API for forwarding to the third party system 130 as appropriate.

The foregoing discussion therefore considers several different systems, devices and methods. These general concepts may be expanded or modified as desired to create any number of alternate but equivalent embodiments. Although advertisements are often discussed above as one example that could be supplemented with third party content, equivalent concepts could be provided to the television programs themselves, or any portion of the programs. A fantasy sports application, for example, could provide user-specific data in window 109 while the viewer is watching a game. Other applications could provide supplemental information about the currently-viewed movie or show, or actors or actresses appearing in the show, or any other data about the program itself. Still other applications could provide interactive games, streaming video (e.g., HLS video), or other content in HTML5 or other format.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A computing device comprising:
an interface to a network;
a processor configured to execute a remote control application that controls a set-top box (STB) via communication over the network, the STB configured to provide television content presented on a display viewed by a viewer, wherein the television content is provided by a content delivery service, and
wherein the remote control application is configured to:
recognize the television content presented using electronic program guide data associated with the television content;
obtain an identifier for additional content associated with the recognized television content, wherein the identifier is obtained from the content delivery service;
transmit a request to a third party service to obtain the additional content associated with the recognized television content, wherein the request includes the identifier for the additional content;

provide an interface to the third party service via an application programming interface (API) of the remote control application;

in response to the request, receive the additional content from the third party service via the API of the remote control application;

wherein the remote control application provides control functionality including channel-changing at the STB, and controlling recordings for digital video recorder (DVR) and remote storage DVR (RSDVR) at the STB.

2. The computing device of claim 1 wherein the content provided by the third party is related to content being currently viewed on the display by the viewer.

3. The computing device of claim 2 wherein the currently-viewed content is an advertisement for a product or service, and wherein the third party is affiliated with the advertiser providing the product or service.

4. The computing device of claim 2 wherein the currently-viewed content is an advertisement for a product or service, and wherein the content provided to the remote control application allows the viewer to purchase the product or service while the advertisement is still playing on the viewer's television.

5. The computing device of claim 1 wherein the application program interface is an HTML5 interface.

6. A method executable by a computing device to provide user control of a set-top box (STB) configured to provide television content to a television, the method comprising:
   executing a remote control application that:
      recognizes the television content presented using electronic program guide data associated with the television content;
      obtains an identifier for additional content associated with the recognized television content, wherein the identifier is obtained from the content delivery service;
      transmit a request to a third party service to obtain the additional content associated with the recognized television content, wherein the request includes the identifier for the additional content;
      provide an interface to the third party service via an application programming interface (API) of the remote control application;
      in response to the request, receive additional content from the third party service via the API of the remote control application;
      generates a display on a user interface that presents the additional content from the third party;
      wherein the remote control application provides control functionality including channel-changing at the STB, and controlling recordings for digital video recorder (DVR) and remote storage DVR (RSDVR) at the STB.

7. The method of claim 6 wherein the application program interface is an HTML 5 interface.

8. The method of claim 6 wherein the remote control application further identifies the content currently presented on the viewer's television.

9. The method of claim 8 wherein the content is identified from an audio fingerprint.

10. The method of claim 8 wherein the content is identified from electronic program guide data.

11. A method to provide third party content associated with television programming on a control device having a processor and a memory, the method comprising:

executing a remote control application on the control device, wherein the remote control application provides control functionality including channel-changing, and controlling recordings for digital video recorder (DVR) and remote storage DVR (RSDVR);

wherein execution of the remote control application further comprises:
   identifying, by the remote control application, the content of television programming currently rendered to a user on a display, wherein the remote control application uses electronic program guide data associated with the content to identify the content;
   receiving an identifier, by the remote control application on the control device, wherein the identifier identifies a location of the third party content on a network, wherein the third party content is associated with the television programming currently rendered to the user, and wherein the identifier is obtained from the content delivery service;
   transmitting a request to a third party service to obtain the additional content associated with the recognized television content, wherein the request includes the identifier for the additional content;
   providing an interface to the third party service via an application programming interface (API) of the remote control application;
   in response to the request, obtaining, by the remote control application using the identifier, the third party content associated with the television programming currently rendered to the user via the API of the remote control application; and
   providing the third party content to the user via the remote control application on the control device, so that the user views the third party content that is associated with the identified television programming at the same time as the identified television programming.

12. The method of claim 11 further comprising receiving inputs from the user in response to the third party content and forwarding the received inputs to a third party service via the network.

13. The method of claim 12 wherein the providing and forwarding are performed by an application program interface (API) associated with a media control application executed by the control device.

14. The method of claim 13 wherein the API is an HTML5 API.

15. The method of claim 11 wherein the identifying comprises providing audio fingerprint data from the television programming to a content management service via the network, and wherein the identifier is obtained from the content management service.

16. The method of claim 11 wherein the identifying comprises identifying the television programming from electronic guide data received at the control device.

17. The method of claim 11 wherein the television programming is previously recorded programming.

18. The method of claim 11 wherein the television programming currently rendered to the user is a previously-broadcast program that the user recorded to a digital video recorder.

19. The method of claim 18 wherein the identifying comprises sending an audio fingerprint of the previously-broadcast program to a content management service via the network to thereby identify the previously-broadcast program as it is currently rendered to the user.

20. The method of claim 11 wherein the television programming is a live television broadcast.

* * * * *